United States Patent Office 3,824,205
Patented July 16, 1974

3,824,205
METHOD FOR STABILIZING ELASTOMERS AND THE ELASTOMERS WHICH ARE PRODUCED ACCORDING TO THIS METHOD
Michel Démarcq, Lyon, and Raymond Petitjean, Hermes, France, assignors to Produits Chimiques Ugine Kuhlmann, Saint-Denis, France
No Drawing. Filed Mar. 7, 1972, Ser. No. 232,508
Claims priority, application France, Mar. 10, 1971, 7108209
Int. Cl. C07f 9/08
U.S. Cl. 260—29.7 P     20 Claims

ABSTRACT OF THE DISCLOSURE

This invention relates to a method for stabilizing elastomers or mixtures based on elastomers which comprises adding thereto alone or in combination with one or more other nonphosphorous stabilizing agents, an effectively stabilizing amount of at least one hydrolysis stable phosphorous ester corresponding to the general formula

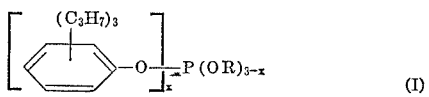    (I)

wherein the group $C_3H_7$ is an isopropyl radical, $x$ is the integer 1, 2 or 3 and R is an aryl or alkaryl radical containing from 6 to about 30 carbon atoms or an aliphatic, cycloaliphatic or arylaliphatic radical containing from 2 to about 30 carbon atoms and from 0 to 2 chlorine atoms, 0 or 1 bromine atom and 0 to 6 oxygen atoms.

This invention also relates to elastomers and mixtures based on elastomers stabilized according to the above method.

BACKGROUND OF THE INVENTION

(I) Field of the Invention

This invention relates to a method for stabilizing elastomers and mixtures based on elastomers with an effectively stabilizing amount of at least one hydrolysis-stable phosphorous ester (phosphite) conforming to formula (I) above, alone or in combination with other non-phosphorous stabilizing agents.

(II) Description of the Prior Art

The use of phosphorous esters, alone or in association with other antioxidants, for the stabilization of rubbers against the deteriorating effects of heat, light, oxygen and ozone has been known for about thirty years and research in this area has continued ever since.

Usually the introduction of antioxidants into synthetic rubbers, generally via the corresponding latex is done in such a fashion that the stabilizing effect of these compounds is manifested during the heat drying of the polymer following its flocculation. It is therefore essential that the phosphite which is selected as the antioxidant be sufficiently resistant to hydrolysis. This requirement is even more imperative when as in the most frequent case, the phosphite is employed as a preformed aqueous emulsion which should be capable of remaining unaltered in its stabilizing properties for several days.

The antioxidant properties of these phosphorous esters is due to the tricoordinated structure of the central phosphorus atom which is present only in the tertiary phosphites. In the presence of water, the tertiary phosphites undergo successive hydrolysis to secondary phosphites and primary phosphites and finally to phosphorous acid. All of these products of hydrolysis possess a tetracoordinated phosphorus atom.

Among the tertiary phosphites, the aryl phosphites are known to be especially susceptible to hydrolysis. Yet the aryl phosphites are the most frequently used stabilizers for elastomers. Moreover, hydrolysis of the aryl phosphites results in the liberation of phenol compounds which because of their disagreeable odor, present a serious disadvantage for various commercial applications of elastomers containing these stabilizers.

The first triaryl phosphite to have been used in rubbers is the triphenyl phosphite disclosed in U.S. Pat. 2,419,354. For the reasons stated above, this phosphite was soon replaced by phosphites of greater molecular weight and/or structural complexity demonstrating increased stability to hydrolysis. The best known phosphites in this category are the tris (nonylphenyl) phosphites commercially supplied under the trade names Polygard and Naugard (French Pat. 1,063,960) of Uniroyal Corp. The use of various antioxidant mixtures such as an alkaryl phosphite and a substituted phenol (French Pats. 1,292,194; 1,339,-252 and 1,347,039) as well as the use for the same purpose of styrenated aryl phosphites (French Pats. 1,319,836; 1,388,246 and 1,391,565) and the phosphites of novolac resins derived from alkylphenols (U.S. Pats. 3,367,996; 3,526,679 and 3,527,725) are also well known.

It has been proposed to improve the hydrolysis stability of triaryl phosphites by adding to them a small quantity of a heavy amine, for example, triisopropanolamine (French Pat. 1,582,387) however, while stability to hydrolysis is improved, the effect is short-lived.

SUMMARY OF THE INVENTION

It has been surprisingly discovered that phosphorous esters corresponding to the general formula:

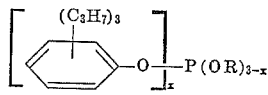

wherein the group $C_3H_7$ is an isopropyl radical, $x$ is the integer 1, 2 or 3 and R is an aryl or alkaryl radical containing from 6 to about 30 carbon atoms or an aliphatic, cycloaliphatic or arylaliphatic radical containing from 2 to about 30 carbon atoms and from 0 to 2 chlorine atoms, 0 or 1 bromine atom and 0 to 6 oxygen atoms, alone or in combination with one or more other nonphosphorous stabilizing agents effectively overcome the disadvantages of the above-described known phosphites.

The phosphites of formula (I), methods for preparing these phosphites and compositions of matter employing stabilizing amounts of the phosphites are disclosed in copending U.S. application Ser. No. 168,418, filed Aug. 2, 1971, now U.S. Pat. 3,787,537, and incorporated by reference herein.

DESCRIPTION OF THE PREFERRED EMBODIMENTS

Examples of phosphites useful according to this invention in which the symbol R designates an aryl or alkaryl group include such groups as the following: phenyl, cresyl, xylyl, isopropylphenyl, isopropylcresyl, diisopropylcresyl, triisopropylphenyl, tetraisopropylphenyl, tertiobutylphenyl, ditertiobutylphenyl, tertiobutylcresyl, octylphenyl, nonylphenyl, dinonylphenyl, trinonylphenyl, dodecylphenyl, α-naphthylphenyl, β-naphthylphenyl, α-methylbenzylphenyl. R can also be a monovalent residue of a polyphenol such as resorcinol, hydroquinone, 1,5-naphthalene diol, bisphenol A, ditertiobutyl bisphenol A and p,p′ diphenol.

Examples of phosphites useful according to this invention in which R designates an aliphatic, cycloaliphatic or arylaliphatic group which can be chlorinated, brominated or oxygenated include such groups as the following: isooctyl, isodecyl, isotridecyl, stearyl, benzyl, methyltri(oxyethyl), methyltri(oxypropyl), 2 - chloro - 1 - ethyl, 2-chloro-1-propyl, 1-chloro-2-propyl, 1,3-dichloro-2-propyl, 2,3-dichloro-1-propyl, 3-chloro-2-butyl, 2-chlorocyclohexyl, 2-chloro-2-phenylethyl. R can also represent a monovalent residue of a polyalcohol such as ethyleneglycol, diethyleneglycol, triethyleneglycol, 1,3-propane diol and 1,4 butanediol.

It is also within the scope of this invention to employ a phosphite conforming to formula (I) to which has been added for the purpose of retarding hydrolysis, less than about 5% by weight of an amine having a boiling point greater than about 150° C. Examples of amines useful according to this invention include such amines as triethanolamine, triisopropanolamine, diethanolamine, diisopropanolamine, tetraisopropanolethylenediamine, aniline, alpha naphthylamine and o-, m-, or p-phenylenediamine.

The phosphites according to this invention can be advantageously employed at a level of from about 0.1 to 10% by weight of the elastomer to be stabilized, and generally at a level of about 0.5 to 5% by weight. The phosphites can be added to the elastomers at any step of their production; however it is advantageous to add the phosphites prior to the coagulation of the latex. The phosphites can be employed as such or in solution with an organic solvent which does not possess any hydroxyl groups. The phosphites can also be made autoemulsifying by adding to them about 0.5 to 100% by weight of an organosoluble emulsifier or the phosphites can be prepared in advance as an aqueous emulsion. In the case where the phosphites are employed as aqueous emulsions, in order to obtain their maximum hydrolysis stability, the emulsions are advantageously maintained at an alkaline pH equal to at least 10. The emulsifier can be anionic, cationic or nonionic; however, it is advantageous to use an emulsifier compatible with that of the elastomer latex.

Examples of elastomers which are suitable for stabilization according to this invention include the natural and synthetic rubbers and more particularly, those which are obtained by the homopolymerization of polyethylenic monomers such as butadiene, isoprene, 2,3-dimethylbutadiene,1,3-pentadiene, 1,4-hexadiene, chloroprene and dicyclopentadiene or by the copolymerization of these products with monoethylenic monomers such as isobutene, styrene, α-methylstyrene, dichlorostyrene, acrylonitrile, methacrylonitrile, acrylic esters and vinylpyridine. Examples of such elastomers include the styrene-butadiene rubbers (SBR), the acrylonitrile-butadiene rubbers (NBR) as well as butyl rubber. Also included are mixtures, grafted or not, of elastomers with nonrubber polymers such as the impact resistant polystyrenes and acrylonitrilebutadienestyrene resins (ABS). The invention also contemplates mixtures of rubbers with plasticizing agents, for example, cold type SBR containing petroleum oils.

The hydrolysis stability of the phosphites of this invention is demonstrated by the results set forth in Table I and obtained using the following test procedure:

5 gm. of the phosphite to be tested were weighed to within 0.1 mg. within a ground 250 ml. flask, 100 ml. of distilled water measured from a pipette and several glass beads were added to the flask. A condenser was fitted to the flask and the temperature of the reaction medium was increased to the boiling point of the mixture as rapidly as possible by means of a Bunsen burner. When the liquid started to boil, a timer was started. At the desired interval, the flask was rapidly cooled and 10 ml. of the solution was withdrawn by pipette. This test sample was diluted with about 50 ml. distilled water and titrated with a decinormal solution of aqueous NaOH until the bromo-phenol indicator turned blue.

Total hydrolysis was arbitrarily defined as the ratio $100x/y$, $x$ being the actual volume of decinormal NaOH consumed and $y$ being the theoretical volume of this reactant calculated upon the hypothesis of a total hydrolysis of phosphite to phosphorous acid.

TABLE I

| Phosphorous esters | Total hydrolysis in percent after boiling for— | |
|---|---|---|
| | 20 min. | 80 min. |
| Triphenyl phosphite | 100 | 100 |
| Trixylyl phosphite | 99 | 100 |
| Tris(monononylphenyl) phosphite | 66 | 97 |
| Mono/dinonylphenyl phosphite (Polygard) | 60 | 87 |
| Polygard HR (containing 1% triisopropanolamine) | 45 | 85 |
| Tris(triisopropylphenyl) phosphite (Example 1) | 22 | 72 |
| Triisopropylphenyl/isopropylidenediphenyl phosphite | 35 | 80 |
| Triisopropylphenyl/isopropylidenediphenyl phosphite with 1% triisopropanolamine | 26 | 75 |

EXAMPLE 1

This example illustrates the use of tris(triisopropylphenyl) phosphite in the stabilization of a styrene-butadiene rubber.

This phosphite was prepared as follows:

(a) Crude triisopropylphenol having a brown color was obtained by condensing phenol with propylene in the presence of an activated mineral clay. The triisopropylphenol was rectified under vacuum and only the middle fraction of the distillate, a yellow or gold liquid, boiling between 139° and 150° under 13–14 mm. Hg representing 95% of the crude product was retained.

Analysis by vapor phase chromatography and mass spectrometry gave the following composition in moles percent: triisopropylphenols (2 isomers), 91 2%; diisopropylphenols (3 isomers), 2.6%; isopropylethers of triisopropylphenols (3 isomers), 5.3%, isopropylethers of diisopropylphenols, trace amounts; and other ethers, probably cyclic structures (chromane or coumarane) of molecular mass 260 (2 isomers), 0.9%.

(b) 641 gm. of previously rectified polyisopropylphenol was charged into a two liter reactor equipped with a stirrer, thermometer, bubble tube, reflux condenser and dropping funnel. 110 gm. of $PCl_3$ were then added. The reactor was heated and hydrochloric acid began to be evolved at about 55° C. The temperature was maintained for 1 hour at 55° to 70° C. and over the next 5 hours it was increased to 210° C., this temperature being maintained for 18 hours during which dry nitrogen was bubbled into the liquid. The reaction then continued for another 14 hours at 240° C. The total conversion of $PCl_3$ was calculated from the percentage of residual combined chlorine taken at different stages of the reaction.

TABLE II

| Total heating time at— | | | | | |
|---|---|---|---|---|---|
| 210° C., hrs | 2½ | 10½ | 18 | 18 | 18 |
| 240° C., hrs | | | | 5 | 14 |
| Total conversion of $PCl_3$, percent | 80.5 | 88 | 91 | 94.7 | 98.3 |

The end product was separated from excess polyisopropylphenols by distillation under 15 mm. Hg and at a final temperature for the residue of 215° C. The remaining phosphite weighing 530 gm. and containing 0.29% combined chlorine was added at 75° C. to 4.8 gm. of epichlorohydrin and maintained at this temperature for 12 hours after which it was cooled. The end product was a very viscous oil of a pale yellow color clearer than that of the starting polyisopropylphenol and had a refractive index of $$n_D^{25} = 1.5220$$

The stabilizing effect of the phosphite thus obtained was compared to Polygard HR which is a mixed mono-/dinonylphenyl phosphite containing 1% triisopropanolamine added to a cold type SBR latex, "Ugitex S2,108," a trade name of Societe Plastugil having the following composition:

Butadiene _____ 68%.
Styrene _____ 32%.
Solids _____ 40% measured according to ASTM D1076–59.
pH _____ 10.5 to 11.5.

The two phosphites were added to the latex in the form of an emulsion of the following composition in parts by weight

| | Parts |
|---|---|
| Phosphite | 1.5 |
| Remcopal 011 (oxyethyl nonylphenol of Société Beycopal) | 0.375 |
| Sodium hydroxide | 0.002 |
| Water | 6 |

The emulsions were prepared by mixing the ingredients in a beaker with a high speed stirrer; using Polygard HR, the procedure was carried out at ambient temperature but with the more viscous tris(triisopropyl-phenyl) phosphite, the procedure was conducted at 50° C.

The quantity of phosphite emulsion added to latex S2.108 was calculated in all cases to be 100 parts of dry rubber containing 1.5 parts of phosphite by weight.

After variable periods of storage at 60° C., each latex mixture was flocculated by the addition of methanol. The polymers which separated were dried in an oven at 80° C. for two hours which was followed by kneading with cylinders under standard conditions to provide sheets of about 2 mm. thickness. The strips cut from these sheets were subjected to an accelerated ageing test in an oven maintained at 165° C.; the evolution of color which could be visually appreciated was taken as a measure of the degree of resinification of the samples. Table III sets forth the result of this test. It is observed that tris(triisopropyl-phenyl) phosphite is at least as effective as Polygard HR and after prolonged storage of the latex at 60° C., with either of these two phosphites, there was no injury to the thermal stability of the rubber.

TABLE III

| Antioxidant | Storage of latex at 60° C. before coagulation | Ageing period in hours at 165° C. | | | | | |
|---|---|---|---|---|---|---|---|
| | | 0 | 1 | 2 | 3 | 4 | 7 |
| Tris(triisopropyl-phenyl) phosphite. | No storage | W | Y | A | A | A* | A |
| | 96 hours | W | Y | A | A | A* | A |
| Polygard HR | No storage | W | Y | A | A | A* | A |
| | 96 hours | W | Y | A | A | A* | A |
| | 96 hours | W | Y | A | A | A* | A |

*Thickness of the resinified layer: about 100 microns.
Symbols.—W=white; Y=start of yellowing; A=amber to brown color.

The superiority of tris(triisopropyl-phenyl) phosphite is more clearly evident from Table IV which shows the evolution of the Mooney stability after three hours of ageing at 170° C.

TABLE IV

| Antioxidant | Storage of latex at 60° C. before coagulation, hours | Ageing at 170° C. | Mooney consistency at 100° C.* | | | | Decrease in Mooney consistency (ML 1+2¼) compared to sample not aged, percent |
|---|---|---|---|---|---|---|---|
| | | | ML 1+2¼ | ML 1+3¾ | ML 1+4 | ML 1+10 | |
| Tris(triisopropyl-phenyl) phosphite | 24 | No ageing | 189 | 190 | 190 | 189 | |
| | | 3 hours | 165 | 173 | 178 | 189 | 14.5 |
| | 96 | No ageing | 184 | 184 | 185 | 183 | |
| | | 3 hours | 155 | 159 | 161 | 161 | 15.7 |
| Polygard HR | 24 | No ageing | 185 | 185 | 185 | 185 | |
| | | 3 hours | 145 | 152 | 156 | 165 | 21.6 |
| | 96 | No ageing | 185 | 185 | 185 | 184 | |
| | | 3 hours | 143 | 148 | 152 | 159 | 22.6 |

*The first of the two numerical values in each column represents the time (1 minute in all cases) for heating before the rotor was started and the second numerical value represents the effective duration of the kneading operation in minutes.

EXAMPLE 2

This example illustrates the application of tris(triisopropyl-phenyl).phosphite in the stabilization of an ABS resin.

The tris(triisopropyl-phenyl).phosphite employed was the same as that in Example 1 but this time it was associated with an antioxidant of the alkylphenol type, Naugawhite, of Uniroyal Corp.

Again, the results were compared with those obtained with the nonylphenyl phosphite, Polygard HR.

The tests were carried out with two types of ABS latex referred to respectively as SF and MF having characteristics set forth in Table V below

TABLE V

| Reference | Latex SF | Latex MF |
|---|---|---|
| Composition | Binary mixture of resin and graft polymer | Ternary mixture of resin, graft polymer and reticulated nitrile rubber |
| Butadiene, percent | 28 | 30. |
| Acrylonitrile, percent | 20.5 | 24. |
| Styrene, percent | 51.5 | 46. |
| Solids, percent | 33 | 33. |
| Emulsifier | Disproportionated rosin salt plus sodium hydroxide. | Disproportionated rosin salt plus sodium hydroxide plus sodium methylene bisnaphthylene sulfonate plus sodium oleate. |
| pH | 10.5 to 11.5 | 10.5 to 11. |

In each, the amounts of stabilizer employed were

| | Percent of dried polymer |
|---|---|
| Phosphite | 3 |
| Naugawhite | 0.125 |

The two antioxidant combinations were employed in the form of an emulsion prepared as follows:

| | Parts by weight |
|---|---|
| Phosphite | 3.0 |
| Naugawhite | 0.125 |
| Remcopal O11 | 0.750 |
| Sodium hydroxide | 0.005 |
| Sequestering agent | 0.1 |
| Water | 8.5 |

The ABS latex was added the choosen quantity of antioxidant emulsion and then was flocculated by pouring it into 1.2 volumes of a 1% aqueous solution of magnesium sulfate over a period of about 20 minutes during which the latex was agitated and maintained at 90–95° C. by bubbling steam therethrough. The coagulated mixture was transferred to a centrifuge where the polymer was washed with water until the waste water was clear and free from foam. The powder thus obtained was dried for about 5 minutes in a ventilated oven at 105° C. until the polymer contained only about 0.3% moisture. After mixing the polymer in a Werner machine using 3 parts lubricant for 100 parts by weight of polymer, part of the polymer was made into sheets of 0.2 to 0.3 mm. thickness and part was made into granules.

In a first test for thermal stability 9 square samples of 4 cm. on a side were cut into the sheet of resin stabilized with tris(triisopropyl-phenyl).phosphite and suspended in a ventilated oven at 170° C. One sample was removed from the oven after 30 minutes and visually compared with a reference sample stabilized with Polygard subjected to the same treatment.

The results obtained demonstrated for each pair of samples, a clear superiority of tris(triisopropyl-phenyl).

phosphite over Polygard in both resin SF and in resin MF (a gain of 1 hour).

In a second test, the stabilized ABS granules were used for injecting into small plates at temperatures of 180°, 200°, 220°, 240° and 260° C., the period of time for heating the resin in the injection pot being 15 minutes. Visual comparison of the coloration of the plates again showed the superiority of tris(triisopropyl-phenyl).phosphite over Polygard which was particularly manifest with resin SF (a gain of 15° C.).

In a third series of tests, the resin plates stabilized as before were subjected to ultra-violet radiation from an arc lamp for a period of from 0 to 120 hours (which is equivalent to approximately 0 to 5 months of exposure to sunlight) and then subsequent yellowing was visually measured. For both the SF and MF resins, the protective effect of tris(triisopropyl-phenyl).phosphite was at least as good as that of Polygard.

We claim:

1. A method for stabilizing elastomers or mixtures based on elastomers which comprises adding thereto alone or in combination with one or more other nonphosphorous stabilizing agents, an effectively stabilizing amount of at least one hydrolysis stable phosphorous ester corresponding to the general formula

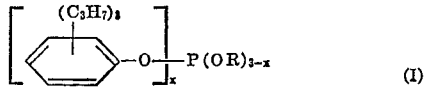

wherein the group $C_3H_7$ is an isopropyl radical, $x$ is the integer 1, 2 or 3 and R is an aryl or alkaryl radical containing from 6 to about 30 carbon atoms or an aliphatic, cycloaliphatic or arylaliphatic radical containing from 2 to about 30 carbon atoms and from 0 to 2 chlorine atoms, 0 or 1 bromine atom and 0 to 6 oxygen atoms.

2. The method according to claim 1 wherein the phosphorous esters of formula (I) are added at a level of about 0.1 to 10% by weight of the elastomer.

3. The method according to claim 1 wherein at least one of the phosphorous esters (I) has $x$ equal to 3.

4. The method according to claim 1 wherein at least one of the phosphorous esters (I) has $x$ equal to 2 and R is a diisopropylphenyl radical.

5. The method according to claim 1 wherein at least one of the phosphorous esters (I) has $x$ equal to 2 and R is the monovalent residue of bisphenol A.

6. The method according to claim 1 wherein at least one of the phosphorous esters (I) has $x$ equal to 2 and R is a xylyl radical.

7. The method according to claim 1 wherein at least one of the phosphorous esters (I) has $x$ equal to 2, and R is a nonylphenyl radical.

8. The method according to claim 1 wherein at least one of the phosphites has $x$ equal to 2 and R is a chloropropyl radical.

9. The method according to claim 1 wherein at least one of the phosphorous esters (I) has $x$ equal to 2 and R is a dichloropropyl radical.

10. The method according to claim 1 wherein less than about 5% of an amine is added by weight of phosphorous ester (I), said amine having a boiling point greater than about 150° C.

11. The method according to claim 10 wherein the amine is triisopropanol amine.

12. The method according to claim 1 wherein the phosphorous ester (I) is employed in the form of an aqueous emulsion.

13. The method according to claim 1 wherein the phosphorous ester (I) is employed in the form of an auto-emulsifying mixture with 0.5 to 100% of its weight of an organosoluble emulsifier.

14. The method according to claim 1 wherein the elastomer is a styrene-butadiene rubber, unextended or extended with petroleum oil.

15. The method according to claim 1 wherein the elastomer is butyl rubber.

16. The method according to claim 1 wherein the elastomer is acrylonitrile-butadiene rubber.

17. The method according to claim 1 wherein the mixtures based on elastomers are impact resistant polystyrenes.

18. The method according to claim 1 wherein the mixtures based on elastomers are acrylonitrile butadiene styrene resins (ABS resins).

19. Compositions of matter which comprise elastomers or mixtures based on elastomers containing an effectively stabilizing amount of at least one phosphorous ester according to claim 1, alone or in combination with one or more other non-phosphorous stabilizing agents.

20. The compositions of matter of claim 19 having a pH of about 10.

References Cited

UNITED STATES PATENTS

| | | | |
|---|---|---|---|
| 2,733,226 | 1/1956 | Hunter | 260—45.7 P X |
| 3,115,465 | 12/1963 | Orloff et al. | 260—45.7 P X |
| 3,412,064 | 11/1968 | Brindell | 260—967 X |

ALLAN LIEBERMAN, Primary Examiner

S. M. PERSON, Assistant Examiner

U.S. Cl. X.R.

260—32.6 A, 45.7 P

UNITED STATES PATENT OFFICE
CERTIFICATE OF CORRECTION

Patent No. 3,824,205            Dated July 16, 1974

Inventor(s) Michel DeMarcq and Raymond Petitjean

It is certified that error appears in the above-identified patent and that said Letters Patent are hereby corrected as shown below:

1. In Column 4, line 29

"912%"

should read

--91.2%--.

2. In Column 5, line 43

"96 hours_____W Y A A A* A should be deleted.

3. In Column 6, line 75

"tris(triisopropyl-phenyl).

should read

--tris(triisopropyl-phenyl)--.

Signed and sealed this 19th day of November 1974.

(SEAL)
Attest:

McCOY M. GIBSON JR.            C. MARSHALL DANN
Attesting Officer              Commissioner of Patents